US012273143B2

(12) United States Patent
Meinecke et al.

(10) Patent No.: US 12,273,143 B2
(45) Date of Patent: Apr. 8, 2025

(54) METHOD FOR OPERATING AN ELECTRO-OPTICAL TRANSMISSION DEVICE FOR ARBITRARY SIGNALS, COMPUTER PROGRAM PRODUCT AND DATA TRANSMISSION DEVICE

(71) Applicant: Volkswagen Aktiengesellschaft, Wolfsburg (DE)

(72) Inventors: Marc-Michael Meinecke, Sassenburg (DE); Heiko Gustav Kurz, Hannover (DE); Christoph Scheytt, Dorsten (DE); Stephan Kruse, Paderborn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 162 days.

(21) Appl. No.: 18/106,936

(22) Filed: Feb. 7, 2023

(65) Prior Publication Data

US 2023/0254039 A1    Aug. 10, 2023

(30) Foreign Application Priority Data

Feb. 8, 2022   (DE) .......................... 102022201312.3

(51) Int. Cl.
*H04B 10/00*   (2013.01)
*G01S 7/03*    (2006.01)
(Continued)

(52) U.S. Cl.
CPC .............. *H04B 10/112* (2013.01); *G01S 7/03* (2013.01); *G01S 13/931* (2013.01)

(58) Field of Classification Search
CPC .............. H04B 10/27; H04B 10/25753; H04B 10/25752; H04B 10/2575;
(Continued)

(56) References Cited

U.S. PATENT DOCUMENTS 7,539,419 B2 *   5/2009  Sasai ................ H04B 10/25753
                                                398/115
11,863,232 B2 *   1/2024  Wang ...................... H03M 3/42
(Continued)

FOREIGN PATENT DOCUMENTS

CN      109375200 A      2/2019
DE     102020202771 A1   9/2021
(Continued)

OTHER PUBLICATIONS

German Appln. No. DE 102022201312.3 Examination Report (Nov. 8, 2022).

*Primary Examiner* — Hanh Phan
(74) *Attorney, Agent, or Firm* — Peter Zura

(57) ABSTRACT

Technologies and techniques for operating an electro-optical transmission device. An optical carrier signal is generated via an optical signal source of a base unit of the transmission device. An arbitrary signal is generated via the optical signal source, and the arbitrary signal is modulated onto the optical carrier signal in the base unit, forming a transmission signal. The transmission signal is transmitted to an antenna unit of the transmission device via an optical transmission medium, and the arbitrary signal and the carrier signal are separated in the antenna unit. Aspects also are directed to a computer program product and to a transmission device configured to perform such functions.

20 Claims, 2 Drawing Sheets

(51) Int. Cl.
*G01S 13/931* (2020.01)
*H04B 10/112* (2013.01)

(58) Field of Classification Search
CPC ........ H04B 10/25759; H04B 10/25754; H04B 10/40; H04B 10/2507; H04B 10/516; H04B 10/532; H04B 10/548; G01S 7/03; G01S 17/931
USPC ....... 398/66, 67, 68, 69, 70, 71, 72, 79, 115, 398/116, 117, 158, 159, 135, 136, 183, 398/188, 202, 208, 137, 138, 139, 201
See application file for complete search history.

(56) References Cited

U.S. PATENT DOCUMENTS

| | | | |
|---|---|---|---|
| 2006/0079290 A1* | 4/2006 | Seto | ............... H04B 7/086 455/562.1 |
| 2015/0207567 A1* | 7/2015 | Bogoni | ............ H04B 10/2575 398/115 |
| 2019/0162819 A1 | 5/2019 | Schneider et al. | |

FOREIGN PATENT DOCUMENTS

| | | |
|---|---|---|
| EP | 2228920 B1 | 9/2010 |
| EP | 3489712 A | 5/2019 |

\* cited by examiner

METHOD FOR OPERATING AN ELECTRO-OPTICAL TRANSMISSION DEVICE FOR ARBITRARY SIGNALS, COMPUTER PROGRAM PRODUCT AND DATA TRANSMISSION DEVICE

RELATED APPLICATIONS

The present application claims priority to German Pat. App. No. 10 2022 201 312.3 to Meinecke, et al, filed Feb. 8, 2022, the contents of which is incorporated by reference in its entirety herein.

TECHNICAL FIELD

The present disclosure relates to technologies and techniques for operating an electro-optical transmission device for, for example, a motor vehicle according to present claims. The present disclosure furthermore relates to a computer program product and to a transmission device.

BACKGROUND

It is already known from the prior art that a plurality of sensors as well as data communication devices are configured in motor vehicles. For example, a motor vehicle can comprise a radar sensor device or a communication device for data transmission.

DE 10 2020 202 771 A1 discloses a system with optical carrier distribution.

EP 3 489 712 A1 relates to a radar system and to a method for operating a radar system.

SUMMARY

Aspects of the present disclosure are directed to a method, a computer program product, and a transmission device, by means of which a transmission from a base unit to an antenna unit and/or from a receiving unit to the base unit and/or from a combined transceiver to one or more base devices can be carried out in a component-reduced manner.

Various aspects are disclosed in the present specification and the independent claims. Other aspects are provided in the dependent claims.

In some examples, a method is disclosed for operating an electro-optical transmission device for a motor vehicle. An optical carrier signal is generated by means of an optical signal source, for example a laser unit, a base unit of the transmission device. An arbitrary signal, such as an arbitrary optical signal, is generated by means of the optical signal source. The laser light can have arbitrary polarization states as well as certain polarization states, or also a superposition of polarization states. The arbitrary signal, which can be a data signal may be modulated onto the optical carrier signal in the base unit, forming a transmission signal. The transmission signal is transmitted to an antenna unit of the transmission device by means of an optical transmission medium, for example an optical fiber. The arbitrary signal and the carrier signal are separated in the antenna unit.

The described method is configured as a computer-implemented method. Another aspect of the present disclosure thus relates to a computer program product comprising program code means, which prompt an electronic processing unit and/or, alternatively or additionally, also an optical processing unit, to carry out a method according to the preceding aspect when the program code means are being processed by the electronic processing unit. The computer program product can also be referred to as a computer program embodied on a tangible medium. Another aspect of the present disclosure thus also relates to a computer-readable memory medium comprising the computer program product.

Aspects of the present disclosure furthermore relates to a transmission device for a motor vehicle, comprising at least one base unit including an optical signal source and comprising an antenna unit, wherein the transmission device is designed to carry out a method according to the preceding aspect. The method is in particular carried out by means of the transmission device.

The electronic processing unit and/or, alternatively or additionally, also an optical processing unit, which can in particular be the base unit, comprises in particular processors, electronic components as well as integrated circuits, to be able to carry out the corresponding method step.

The present disclosure furthermore also relates to a motor vehicle including a transmission device according to the preceding aspect.

The present disclosure also encompasses refinements of the transmission device according to the present disclosure of the motor vehicle, which include features described herein. For this reason, the corresponding refinements of the transmission device according to the present disclosure and of the motor vehicle are not described again here for the purposes of brevity.

The present disclosure also encompasses the combination of the features of the described embodiments.

BRIEF DESCRIPTION OF THE DRAWINGS

Various aspects of the present disclosure are described hereafter. In the drawings.

DETAILED DESCRIPTION

Figure 1:
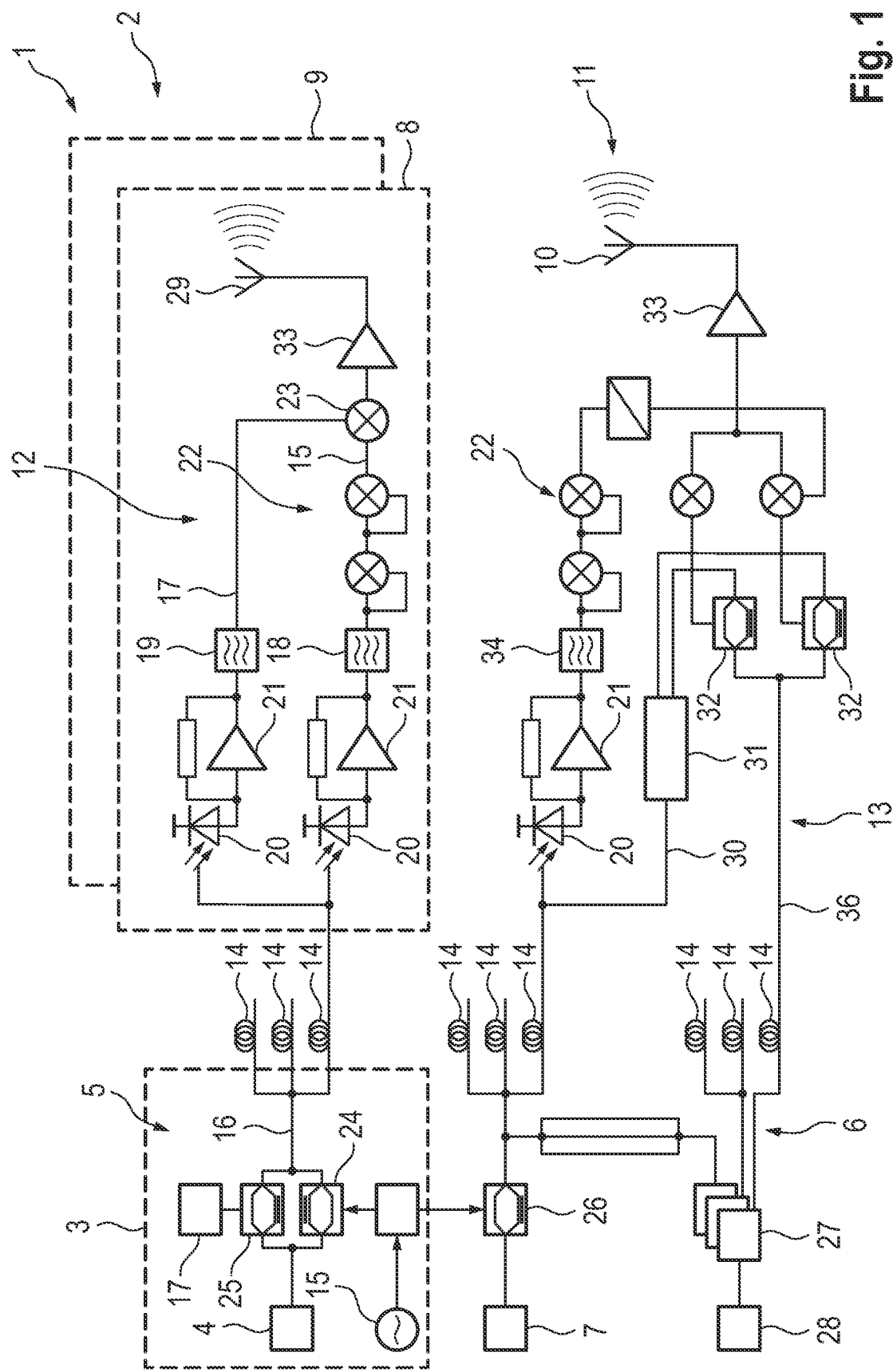
FIG. 1 shows a schematic block diagram according to an example of a transmission device according to some aspects of the present disclosure.

The exemplary embodiments described hereafter are preferred exemplary embodiments of the present disclosure. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

In the examples disclosed herein the optical transmission medium may be utilized both with radar sensor devices and with communication devices for distributing a data signal or modulation signal and clock signal to arbitrarily remotely situated front end units, such as antenna units. For the return path, for example, the laser light can be used for the optical clock distribution to generate an optical IQ return path. The IQ return path may be configured as the return path of a so-called quadrature amplitude modulation.

At least one optical transmission medium may be provided for the distribution of the clock and data and for the return path. In today's state of the art of radio-over-fiber (ROF) systems, the maximum working frequency is limited by the maximum bandwidth of the Mach-Zehnder modulators or the laser drivers. The present disclosure thus makes it possible, through skillful system design, to achieve arbitrarily high frequencies, while minimizing the number of required optical transmission media in the process.

In some examples, the reuse of the carrier signal and of the arbitrary signal is thus provided. The optical carrier signal may thus be generated in the base unit, which can also be referred to as a base station, and, for example, can be configured as an electronic processing unit and/or, additionally or alternatively, an optical processing unit. For example, an optical source, preferably a laser diode, is required for this purpose. The optical carrier signal can be static, that is, fixed, or dynamic, that is, not fixed and thus variable, depending on the signal source.

Furthermore, an arbitrary signal, for example an IQ data signal and/or a cognitive radar signal are modulated directly onto the optical source and/or modulated at the output of the optical source. The two signals are superimposed and relayed via a single optical transmission medium, after possibly separating the signal, to an arbitrary number of antenna units, but at least one antenna unit. In the antenna unit, and in particular in the so-called transmitter of the antenna unit, the optical signal is converted, for example, into two separate electrical signals. As an alternative, however, the arbitrary signal, which is modulated in the central station, may be generated in terms of the spectral properties so as to have the desired spectral properties following up-conversion. Electronic and/or optical filter units can be installed in the individual signal paths, which separate the carrier signal from the arbitrary signal. However, it is also possible to use only one optical-electronic converter device and to then separate the signals. In this case, a separate electrical filter can be used for the separation and/or the circuits used have the necessary filter characteristics.

In some examples, a corresponding transmission device may require only one optical transmission medium to distribute an arbitrary signal, for example, the IQ data signal, and the at least one carrier signal to antenna units located at an arbitrary distance, which can also be referred to as front-end units. For this purpose, the carrier signal and the arbitrary signal may be combined in the optical area. The signals are separated in the antenna unit. An arbitrary frequency conversion of the carrier signal can then take place in the antenna unit. The system or the transmission device furthermore does not require any fast optical modulators since the signal, which is modulated onto the optical carrier in the base unit, can only be a fraction of the actual sending frequency. If it can be ensured that the send and receive signals can be at least partially reconstructed, for example by utilizing orthogonality and/or a kind of multiple access between the arbitrary send signal and the receive signal, the signal that is distributed to the antenna unit can also be reused for the return path, that is, as a receiving unit within the base unit. Otherwise, a further modulator will generate a second reference signal, or the optical signal course can directly generate a second reference signal. In any case, no further optical source, for example a further laser unit, is needed in the antenna unit.

As an alternative or in addition, however, an optical source can be used on the antenna units under some examples. The carrier signal may be generated centrally, whereby all antenna units have the same sending frequency, making complex timing recovery unnecessary, with the timing recovery nonetheless being able to be carried out. Moreover, the transmission device enables arbitrary modulation formats, and not just frequency-modulated continuous wave (FMCW) radar, but can also be utilized, for example, for pseudo noise or orthogonal frequency-division multiplexing (OFDM) methods, for example in radar sensor units. The transmission device is furthermore suitable for applications in the area of software-defined radar since the modulation format and the carrier frequency can be modified by a simple change in the programming of the signal processing unit in the base unit, and is thus only determined by the software, and not by the hardware. Nevertheless, of course, it is also possible to carry out changes by way of the hardware, for example by a "power detector" which can change a sending frequency directly. Moreover, the radar system can thus also be used for cognitive radar.

The transmission device can, for example, be used in a motor vehicle for a radar sensor unit or a communication unit. However, this shall only be understood by way of example, and in no way in a limiting manner. The transmission device can also be used in other technical devices, for example in data centers.

In some examples, the carrier signal and the arbitrary signal may have either different frequency bands and/or polarizations and/or a kind of MAC. MAC shall be understood to mean "multiple access", such as different time slots for the different signals. In this connection, this can be formulated by "another manner of separating the signals."

For the sake of simplicity, only one entity is referred to hereafter for the descriptions. Unless explicitly noted, however, the present disclosure can also in each case comprise several of the affected entities. In this respect, the use of the words "a or "one" shall only be understood as an indication that at least one entity is used in a simple embodiment.

To the extent that methods are described hereafter, the individual steps of a method can be arranged and/or combined in an arbitrary order, provided that nothing deviating therefrom can be explicitly derived from the context. Furthermore, the methods can be combined among one another, unless explicitly identified otherwise.

Information containing numerical values shall, in general, not be understood to mean exact values, but also have a tolerance of +/−1% up to +/−10%.

Any reference to standards or specifications or norms shall be understood as a reference to standards or specifications or norms that apply/applied at the time of the application and/or—if priority is claimed—also at the time of the priority application. However, this shall not be understood to mean a general exclusion of the applicability to standards or specifications or norms that follow or replace these.

In some examples, the carrier signal may be generated using a first optical modulator and/or the arbitrary signal may be generated using at least one second optical modulator. In some examples, the optical modulators can be so-called Mach-Zehnder modulators. The base unit thus may include a first Mach-Zehnder modulator and at least one second Mach-Zehnder modulator. In this way, the carrier signal and the arbitrary signal can be generated reliably. As an alternative, the optical signal source can also be designed directly for modulating the signals.

It is furthermore advantageous that an IQ signal is generated as the arbitrary signal. The IQ signal may be configured as a so-called quadrature amplitude modulated signal. This is a modulation method of electronic communications engineering that combines amplitude modulation and phase modulation. In this way, advantageous data transmission can be implemented.

In some examples, it may be advantageous when the carrier signal and the arbitrary signal are separated from one another by means of respective filter units in the antenna unit. For example, the filter unit for the carrier signal can be a band-pass filter. The filter unit for the arbitrary signal can, for example, be designed as a high-pass filter or as a low-pass filter. The filter units can be designed as electrical filters, but also as optical filters. In this way, it is made possible for the corresponding signals to be separated from one another by means of simple electrical and/or optical filters.

In some examples, frequency multiplication of the carrier signal and/or signal multiplication of the carrier signal with the arbitrary signal may be carried out in the antenna unit. For example, an arbitrary frequency conversion of the carrier signal can thus be carried out in the antenna unit. Before or after the frequency conversion, the arbitrary signal, which may correspond to a data signal, is in turn multiplied with the carrier signal. Due to the filter, such as a band-pass filter, or due to a multitude of filters upstream or downstream from a transimpedance amplifier, the optical carrier signal can be distributed to the corresponding optical receiving unit again and be reused. The carrier signal can thus be multiplied to arbitrary frequencies before being multiplied with the arbitrary signal. As an alternative, it is also possible for the multiplication to be carried out in the antenna unit prior to the frequency multiplication. The signal is then amplified and can be emitted via the corresponding antenna unit.

In this regard, it should be pointed out that the antenna unit for the send and receive path can be both spatially separated and spatially combined.

In some examples, it may be advantageous when the carrier signal for the evaluation of a receive signal is returned to an evaluation unit of the base unit. The base unit can thus be designed for sending and for receiving. Only one laser diode is thus required for this purpose. As an alternative, it is also possible for the send and receive signals to be electrically returned. A band-pass filter in the receiving unit allows also the laser signal, which is distributed to the antenna unit, to be reused. In this way, for example, a further Mach-Zehnder modulation can be dispensed with in order to reuse the carrier signal for the return path, that is, for the receiving unit of the base unit.

In some examples, it may be advantageous when the receive signal is received orthogonally to the arbitrary signal. In order to reuse the signal for the return path, that is, for the receiving unit of the base unit, the receive signal is received orthogonally to the arbitrary signal or an arbitrary kind of multiple access. The optical IQ modulation can, for example, also be reused for this case. Polarization multiplexing is furthermore also possible, wherein a modulator then supports the polarization multiplexing.

In some examples, it may be advantageous when the transmission device is provided for a radar sensor device of the motor vehicle and/or for a communication device of the motor vehicle. In this way, it is made possible that the transmission device according to the present disclosure or the corresponding method can be used both for radar sensor devices and for communication devices. In this way, the transmission device can be used in a multifaceted manner.

Turning to FIG. 1, the drawing shows a schematic block diagram according to an embodiment of a transmission device 1 for a motor vehicle 2, which is shown schematically. The transmission device 1 may include at least one base unit 3, which can be configured as electronic and/or optical processing units. The base unit 3 may include at least one laser unit 4, serving as an optical signal source. In this example, the base unit 3 is divided into a sending part 5 and a receiving part 6. The laser unit 4 is configured in the sending part 5 in the present example. A further laser unit 7 is configured in the receiving part 6. The laser unit 4 and the further laser unit 7 are in particular designed as arbitrary optical sources.

The transmission device 1 may also include at least one antenna unit 8. The present exemplary embodiment purely schematically illustrates that the transmission device 1 can also comprise further antenna units 9. The disclosure provided with respect to the antenna unit 8 apply analogously to the further antenna units 9. All or also only certain or no antenna units 8, 9 can be combined to form larger antenna units 8, 9.

The transmission device 1 may also include receiving antennas 10. It is in turn possible for a plurality of the receiving antennas 10 to be present, that is, it is also possible for further receiving antennas 11 to be provided. The disclosure provided with respect to the receiving antenna 10 apply analogously to the further receiving antennas 11. All, or also only certain, or no, antenna units 8, 9 can be combined to form larger antenna units 8, 9. Furthermore, it is likewise possible to combine the antenna unit 8 and the receiving antenna 10, or to combine the antenna unit 9 with the receiving antenna 11.

In some examples, the sending part 5 and the antenna unit 8, or the further antenna units 9, may form a sending unit 12. The receiving antenna 10 and the receiving part 6 can, in turn, form a receiving unit 13.

In some examples, the base unit 3 may be dislocated from the antenna unit 8 and the receiving antenna 10. Respective optical fibers 14 between the base unit 3 and the antenna unit 8 or the receiving antenna 10 may be configured as optical transmission media. The base unit 3 may be coupled to the antenna unit 8 by way of a single optical fiber 14. The base unit 3 may be coupled to the respective further antenna unit 9 in each case by way of further optical fibers 14. The base unit 3 may likewise be coupled to the receiving antennas 10 by way of corresponding optical fibers 14.

In the method according to the present disclosure for operating the transmission device 1, it is provided in some examples that an optical carrier signal 15 may be generated by means of the laser unit 4 of the base unit 3. Furthermore, an optical data signal 17 may be generated by means of the laser unit 4. The optical data signal 17 may be modulated onto the optical carrier signal 15 in the base unit 3, forming a transmission signal 16. The transmission signal 16 may be transmitted to the antenna unit 8 of the transmission device 1 by means of the optical fiber 14. The arbitrary signal 17 and the carrier signal 15 may be separated in the antenna unit 8. In particular, by means of a first filter unit 18, in the present example configured as a band-pass filter, the carrier signal 15 and, by means of a second filter unit 19, in the present example designed in particular as a high-pass filter, the arbitrary signal 17 are separated from one another.

In some examples, opto-electronic converters, for example photodiodes 20, can be used for the conversion of the optical carrier signal 15 and the optical arbitrary signal 17. Furthermore, transimpedance amplifiers 21 are shown.

In some examples, a frequency multiplication 22 of the carrier signal 15 and/or the signal multiplication 23 of the carrier signal 15 with the arbitrary signal 17 may be carried out in the antenna unit 8.

FIG. 1 furthermore illustrates that the carrier signal 15 is generated by means of a first Mach-Zehnder modulator 24 and/or the arbitrary signal 17 is generated by means of a second Mach-Zehnder modulator 25. Furthermore, the base unit 3 can comprise a third Mach-Zehnder modulator 26, in the receiving part 6. Furthermore, a coherent receiver 27 is configured in the receiving part 6, wherein the received signals can be transmitted from the coherent receiver 27 to signal processing 28, for further evaluation. The coherence can be generated by self-coherence by means of the laser signal or using a separate source.

The antenna unit 8 may be configured as a sending antenna 29. Additionally, a signal amplifier 33 is shown in the antenna unit 8.

In some examples, a so-called IQ signal 30 can be generated, wherein an IQ generator 31 can be provided for this purpose. Furthermore, additional Mach-Zehnder modulators 32 are shown in the receiving unit 13. The receiving unit 13 furthermore likewise comprises a band-pass filter 34 as well as a frequency multiplication unit 22.

The transmission device 1 is preferably provided for a radar sensor device of the motor vehicle 2 and/or for a communication device of the motor vehicle 2.

In some examples, the optical carrier signal 15 may be generated in the first Mach-Zehnder modulator 24 in the base unit 3. At least one laser diode is required for this purpose. The carrier signal 15 can be static or dynamic, this being dependent on the signal source. Furthermore, an arbitrary signal 17 is generated in the second Mach-Zehnder modulator 25, for example an IQ data signal or an IQ cognitive radar signal, which is modulated onto the output of the laser diode. The two signals are superimposed and relayed to the antenna unit 8 via a single optical fiber 14. The transmission signal 16 is converted into two separate electrical signals by means of a transmitter, which is provided by the photodiodes 20 in the present example. Filter units 18, 19, which separate the carrier signal 15 from the arbitrary signal 17, are configured in the individual signal paths. However, it is also possible to use only one optical electrical converter device, which then in turn separates the signals. The carrier signal 15 can then be multiplied to arbitrary frequencies before being multiplied with the arbitrary signal 17. It is furthermore also possible to carry out the multiplication in the antenna unit 8 prior to the frequency multiplication 22. The signal is then again amplified and can be emitted via the antenna element 29.

Figure 2:
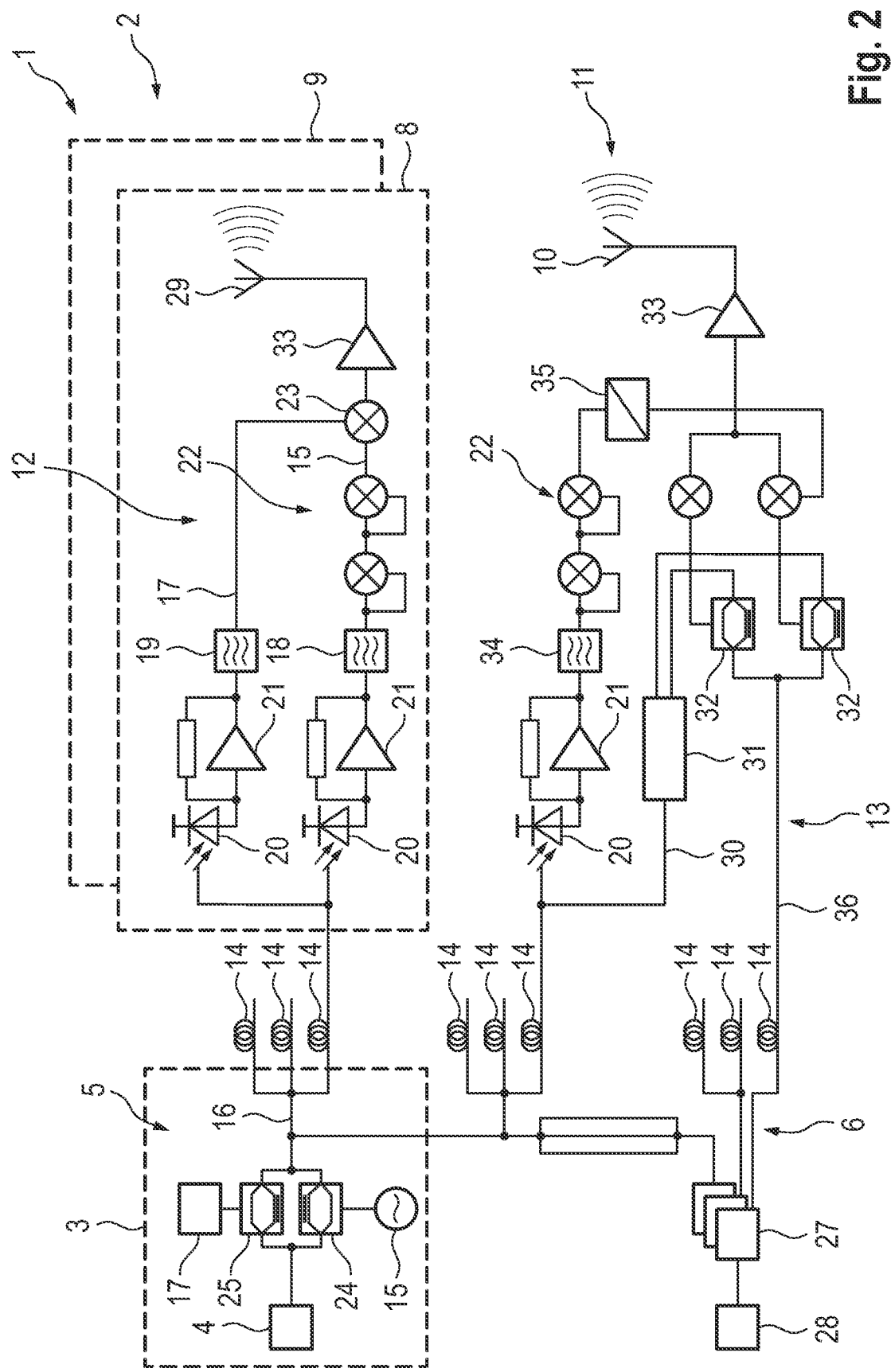
FIG. 2 shows a further schematic block diagram according to another example of a transmission device according to some aspects of the present disclosure.

FIG. 2 shows a further schematic block diagram according to an embodiment of the transmission device 1. In FIG. 1, the sending part 5 and the receiving part 6 are configured together. In FIG. 1, the optical return path is generated by way of the second laser diode or a second laser unit 7 using the third Mach-Zehnder modulator 26. In contrast, FIG. 2 shows that the method can also be carried out by means of the one laser device 4. In the present exemplary embodiment, the further band-pass filter 34 also allows the laser signal, which is distributed to the antenna unit 8, to be reused. In this case, in particular the third Mach-Zehnder modulator 26 can be dispensed with. So as to reuse the signal for the return path of all of the base units 3, however, the received signal must be orthogonal to the arbitrary signal 17, which in the present example is illustrated by the block 35, or an arbitrary kind of multiple access must be present. The optical IQ demodulation can also be reused for this case.

The transmission device 1 shown in FIG. 1 and FIG. 2 thus only requires one optical fiber 14 for distributing the arbitrary signal 17 and the carrier signal 15 to antenna units 8 or receiving antennas 10 located arbitrarily far away. For this purpose, the two signals are combined in the optical area. The signals are in turn separated in the antenna unit 8. An arbitrary frequency conversion of the carrier signal 15 can then take place in the antenna unit 8. The arbitrary signal 17 is then multiplied with the carrier signal 15 before or after the frequency conversion. Due to the band-pass filter 34 downstream from the transimpedance amplifier 21 on the receiver side, the optical carrier signal 15, which is distributed to the antenna unit 8, can be reused. If orthogonality or a form of multiple access exists between the received signal and the arbitrary signal 17, the received signal can also be utilized for the return path between the receiving antenna 10 and the base unit 3. In particular, the signals only must not interfere with one another so strongly that these cannot be regenerated. As an alternative, a second reference signal can be generated using a further modulator.

LIST OF REFERENCE NUMERALS 1 transmission device
2 motor vehicle
3 base unit
4 laser unit
5 sending part
6 receiving part
7 further laser unit
8 antenna unit
9 further antenna unit
10 receiving antenna
11 further receiving antennas
12 sending unit
13 receiving unit
14 optical fiber
15 carrier signal
16 transmission signal
17 arbitrary signal
18 band-pass filter
19 high-pass filter
20 photodiode
21 transimpedance amplifier
22 frequency multiplication
23 signal multiplication
24 first Mach-Zehnder modulator
25 second Mach-Zehnder modulator
26 third Mach-Zehnder modulator
27 coherent receiver
28 signal processing
29 antenna element
30 IQ signal
31 IQ generator
32 further Mach-Zehnder modulator
33 signal amplifier
34 further band-pass filter
35 block

The invention claimed is:

1. A method for operating an electro-optical transmission device, comprising:
generating an optical carrier signal via an optical signal source of a base unit of the electro-optical transmission device;
generating an arbitrary signal via the optical signal source, the arbitrary signal comprising a modulated signal carrying data or radar information;
modulating the arbitrary signal onto the optical carrier signal in the base unit, to form a transmission signal;

transmitting the transmission signal to an antenna unit of the electro-optical transmission device via an optical transmission medium; and separating the arbitrary signal and the carrier signal in the antenna unit.

2. The method according to claim 1, wherein generating the optical carrier signal comprises generating the optical carrier signal via a first optical modulator or a first electro-optical modulator.

3. The method according to claim 2, wherein generating the optical carrier signal comprises generating the arbitrary signal via a second optical modulator or a further electro-optical modulator.

4. The method according to claim 1, wherein the arbitrary signal comprises an in-phase quadrature (IQ) signal.

5. The method according to claim 1, further comprising separating the carrier signal and the arbitrary signal via respective filter units in the antenna unit.

6. The method according to claim 1, further comprising at least one of:

performing a frequency multiplication of the carrier signal with the arbitrary signal in the antenna unit, and/or performing a signal multiplication of the carrier signal with the arbitrary signal in the antenna unit.

7. The method according to claim 1, further comprising returning the carrier signal to an evaluation unit of the base unit for the evaluation of a receive signal.

8. The method of claim 7, wherein the receive signal is received orthogonally to the arbitrary signal.

9. An apparatus for electro-optical transmission for a motor vehicle, comprising:

at least one base unit comprising an optical signal source; and an antenna unit operatively coupled to the at least one base unit, wherein the at least one base unit is configured to generate an optical carrier signal via an optical signal source of a base unit of the electro-optical transmission device;

generate an arbitrary signal via the optical signal source, the arbitrary signal comprising a modulated signal carrying data or radar information;

modulate the arbitrary signal onto the optical carrier signal in the base unit, to form a transmission signal;

transmit the transmission signal to an antenna unit of the electro-optical transmission device via an optical transmission medium; and separate the arbitrary signal and the carrier signal in the antenna unit.

10. The apparatus according to claim 9, wherein the at least one base unit is configured to generate the optical carrier signal by generating the optical carrier signal via a first optical modulator or a first electro-optical modulator.

11. The apparatus according to claim 10, wherein the at least one base unit is configured to generate the optical carrier signal by generating the arbitrary signal via a second optical modulator or a further electro-optical modulator.

12. The apparatus according to claim 9, wherein the arbitrary signal comprises an in-phase quadrature (IQ) signal.

13. The apparatus according to claim 9, wherein the at least one base unit is configured to separate the carrier signal and the arbitrary signal via respective filter units in the antenna unit.

14. The apparatus according to claim 9, wherein the at least one base unit is configured to:

perform a frequency multiplication of the carrier signal with the arbitrary signal in the antenna unit, and/or perform a signal multiplication of the carrier signal with the arbitrary signal in the antenna unit.

15. The apparatus according to claim 9, wherein the at least one base unit is configured to return the carrier signal to an evaluation unit of the base unit for the evaluation of a receive signal.

16. The apparatus of claim 15, wherein the receive signal is received orthogonally to the arbitrary signal.

17. A non-transitory computer-readable medium including program instructions on a storage medium, the instructions when that executed by a processor configured for electro-optical transmission for a motor vehicle, causes the processor to perform:

generating an optical carrier signal via an optical signal source of a base unit of the electro-optical transmission device;

generating an arbitrary signal via the optical signal source, the arbitrary signal comprising a modulated signal carrying data or radar information v;

modulating the arbitrary signal onto the optical carrier signal in the base unit, to form a transmission signal;

transmitting the transmission signal to an antenna unit of the electro-optical transmission device via an optical transmission medium; and separating the arbitrary signal and the carrier signal in the antenna unit.

18. The non-transitory computer-readable medium according to claim 17, further comprising separating the carrier signal and the arbitrary signal via respective filter units in the antenna unit, wherein the arbitrary signal comprises an in-phase quadrature (IQ) signal.

19. The non-transitory computer-readable medium according to claim 17, further comprising at least one of:

performing a frequency multiplication of the carrier signal with the arbitrary signal in the antenna unit, and/or performing a signal multiplication of the carrier signal with the arbitrary signal in the antenna unit.

20. The non-transitory computer-readable medium according to claim 17, further comprising returning the carrier signal to an evaluation unit of the base unit for the evaluation of a receive signal, wherein the receive signal is received orthogonally to the arbitrary signal.

\* \* \* \* \*